A. BALDWIN.
Improvement in Steam Cotton-Presses.
No. 4,913. Reissued May 28, 1872.
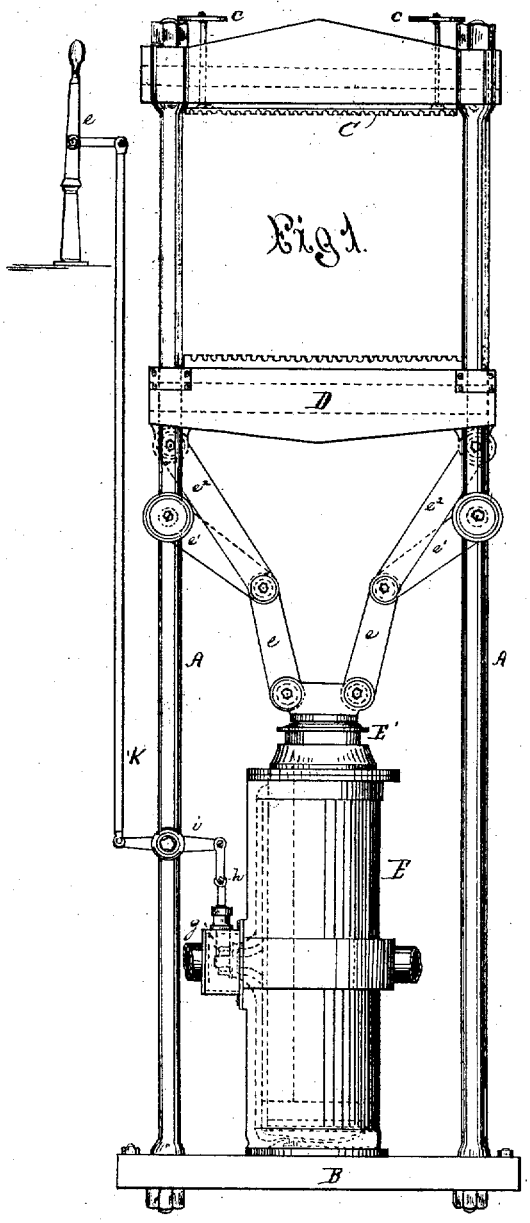
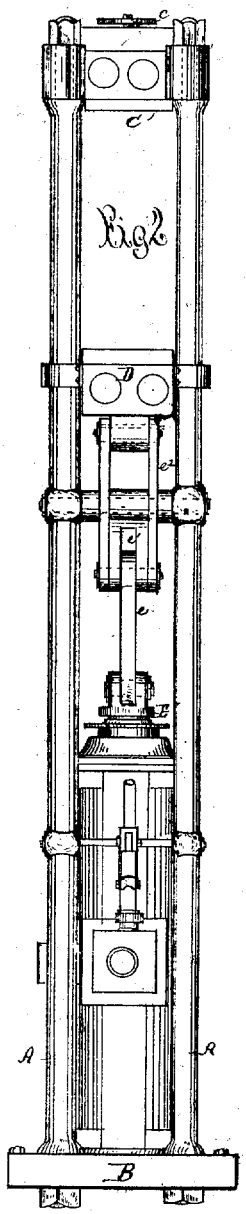
WITNESSES.
H. Clarkin Clark
Chas. E. Chinn
INVENTOR.
A. Baldwin, assi. to F. G. Wheeler Pendent of the Compressing Company by Dyer, Beadle & Co. attys.

UNITED STATES PATENT OFFICE.

AUGUSTINE BALDWIN, OF NEW YORK, N. Y., ASSIGNOR TO THE COMPRESSING COMPANY, OF SAME PLACE.

IMPROVEMENT IN STEAM COTTON-PRESSES.

Specification forming part of Letters Patent No. 103,123, dated May 17, 1870; reissue No. 4,913, dated May 28, 1872.

SPECIFICATION.

The following is a full and exact description of the invention of AUGUSTINE BALDWIN, reference being had to the accompanying rawing and to the letters of reference marked thereon.

This invention is an improvement in cotton and other presses; and consists in the connection of the piston directly with the movable platen by means of the lever-arms, combined substantially as described; and also in the combination of the piston, the lever-arms, the movable platen, and the standards, substantially as described.

In order that those skilled in the art to which this invention appertains may be able to make and use this improved press, we will proceed to describe the same, referring to the accompanying drawing and to the letters of reference marked thereon, the same letters denoting identical parts in both figures.

Figure 1 is a side elevation, and Fig. 2 an end elevation of this improved press.

The frame-work of this improved press consists of four strong columns or standards, A A A A, preferably of metal, which set below into a firm base, B, constituting the foundation of the press. The upper ends are similarly secured above. To the upper ends of the standards is secured the cap or upper platen C, adjusted by the set-screws *c c* so as to be exactly parallel with the lower platen. The lower or moving platen D is held upon the standards by suitable loose clamps, and slides freely upon said standards. $e\ e\ e^1\ e^1\ e^2\ e^2$ represent two sets of lever-arms, each set pivoted together by a pivot common to all its parts, and each set also pivoted to the movable platen and to the steam-piston.

The operation of these arms is as follows: When the press is ready for action the piston rests at the bottom of the cylinder, the arms $e\ e\ e^1\ e^1\ e^2\ e^2$ being in the position shown in Fig. 1. As the piston rises in its movement it will be observed that the arms $e\ e\ e^2\ e^2$, in moving upward, operate upon the platen in an almost direct line, giving it, consequently, a rapid initial motion. As the piston advances, however, the point of connection of the arms $e\ e^1\ e^2$ will swing in the arc of a circle, the center of which is the point of the fixed pivoting of the arm $e^1$. It will result that the arms $e^1\ e^2$ will approach more and more nearly to coincidence with the same straight line, and the arm *e* will be thrown more and more from a perpendicular position to a horizontal. This progressive action will give constantly-increasing power, with constantly-diminishing velocity, of ascent of the platen, until the arms $e^1\ e^2$ are in the same straight line, when all forward motion must cease.

In the lower part of the frame-work, resting on the lower basis, is the engine E, with its piston E′ working vertically, and connected directly by proper ears to the lower connecting-arms of each lever system. The engine is of ordinary construction, with suitable inductive and exhaust pipes, packing, and valve. The valve *g* is connected by the bar *h* to lever *i*, centrally pivoted to the stand A, and further connected by rod K to the hand lever *l*, which is so arranged with the press as to be within reach of the operator standing on the platform where the cotton or other material is fed to the press.

The operation will be readily understood from the drawing. The machine having been fed with the material to be pressed, the operator, by movement of the hand-lever, admits steam beneath the piston, forcing up the lower platen, and a reverse motion returns the piston. The engine is used with special economy and efficiency in connection with this system of lever-arms, which, acting with immense advantage of leverage at the end of the stroke, the steam may be cut off early in the stroke, and a great saving be thus effected.

Some of the special advantages obtained by this peculiar construction are: compactness, simplicity, and enormous strength with small weight of material. The engine-piston being directly connected to the movable platen by means of the levers or arms, there is no waste room, and the parts required are few and simple. No gearing or complicated system for communicating power is employed, and, consequently, the amount of friction is very largely reduced. If desired the equivalent motor-power—the screw with traveling nut, as commonly used in presses of this class—may be employed instead of the cylinder and piston for driving home the platen; but the latter, in the arrangement here shown, is preferred.

It will be seen that the position of the steam-piston, movable platen, and fixed platen may be reversed, so as to compress downward, without departing from the spirit of this invention.

Having thus fully described this invention, what we claim as new, and desire to secure by Letters Patent, is—

1. The connection of the piston directly with the movable platen by means of the lever-arms, combined substantially as described.

2. The combination of the piston, the lever-arms, the movable platen, and the standards, substantially as described.

THE COMPRESSING COMPANY,
F. G. WHEELER, *President.*

Witnesses:
A. BALDWIN,
E. GREENAWAY.